April 21, 1959

D. D. STOLTMAN 2,883,112

AIR BLEED CONTROL

Filed Aug. 18, 1958

INVENTOR.
Donald D. Stoltman
BY
R. F. Barnard
ATTORNEY

United States Patent Office 2,883,112
Patented Apr. 21, 1959

2,883,112
AIR BLEED CONTROL

Donald D. Stoltman, Henrietta, N.Y., assignor to General Motors Corporation, Detroit, Mich., a corporation of Delaware Application August 18, 1958, Serial No. 755,584

7 Claims. (Cl. 236—101)

The present invention relates to a device adapted to be incorporated in the induction system of an internal combustion engine whereby uncarbureted air may be bled into the system when the ambient temperature exceeds a predetermined value to maintain efficient engine operation. More specifically the present device relates to a temperature controlled air bleed unit that may be applied to any part of the induction system exposed to manifold vacuum. The subject unit may be incorporated in such system either as an original component thereof or subsequently added to the system as an accessory.

It is a well known phenomena in a conventional carbureted fuel system that under hot ambient operating conditions the normal and desired fuel-air ratio is frequently upset due to the decreased density of the air being inducted into an internal combustion engine. As a consequence of the decreased air density the fuel-air ratio is increased causing the mixture to run rich with a consequent waste of fuel and frequent rough engine operation. This situation is particularly aggravated under engine idling conditions when the fuel-air ratio may be unbalanced to such an extent that the engine is stalled due to overenrichment.

Another and equally important cause of temperature induced overenrichment is due to fuel vaporization. The fuel in the carburetor float is subjected to considerable heat under high ambient operating temperatures. Under these conditions a relatively high rate of fuel vaporization takes place and which fuel vapors pass through the internal vents to the induction passage producing overenrichment which is particularly troublesome during idling.

As illustrated in Patent 1,721,633 Matteson, efforts have been made to correct this overenrichment by providing a temperature responsive valve which bled excess air into the intake manifold to thereby re-establish desired fuel-air ratio under hot engine operating conditions.

The present invention represents an improvement over previous devices in the provision of a temperature controlled air bleed unit which may be incorporated in the fuel induction system at any point in communication with manifold vacuum thereby increasing the utility of such device. Further, the present invention represents an improvement over previous devices in the provision of means for adjustably controlling the temperature at which such device will become operative to bleed air into the induction system and further providing means for regulating the quantity of uncarbureted air which may be admitted into the induction system.

Other objects and advantages of the present invention will be apparent from a perusal of the detailed description which follows.

Figure 1:
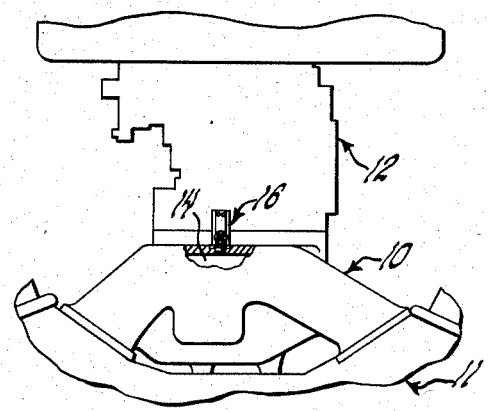
Figure 1 illustrates the subject air bleed unit mounted on an intake manifold.

Referring to Figure 1 of the drawings, an intake manifold 10 is mounted on an internal combustion engine 11. Any conventional carburetor 12 is provided for delivering a combustible charge to the intake manifold which in turn delivers the charge to the various cylinder intake passages 14.

In the conventional manner, air is drawn through carburetor 12 in proportion to the differential between atmospheric pressure and manifold vacuum and thereby induces a proportionate quantity of fuel to mix therewith and pass as a combustible mixture into the intake manifold. Inasmuch as the quantity of fuel induced to flow and mix with the air drawn through carburetor 12 is proportional to the square root of venturi section, it is apparent that the fuel system does not accurately take into account changes in air density. Thus a given quantity of air flow through the carburetor induction passage will cause a constant quantity of fuel to be induced into the induction passage substantially without regard to air density. Accordingly, it will be seen that under hot engine ambient temperature conditions the fuel-air ratio will be increased due to the fact that a given quantity of fuel is actually mixing with a less dense volume of air than would be true under relatively cooler operating conditions. As already noted, this condition results first in an uneconomical use of fuel and secondly, will cause rough engine operation and even engine stalling under idling conditions.

In order to maintain a substantially constant fuel-air ratio with a warmed engine, a device indicated generally at 16 is provided for the purpose of bleeding excess air into the fuel induction system when the ambient operating temperatures exceed a predetermined value.

Figure 2:
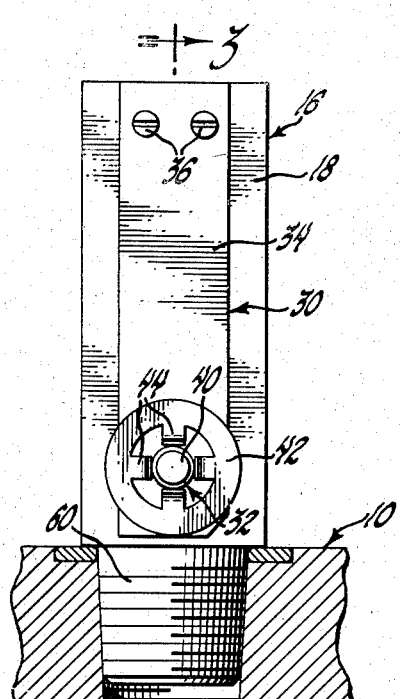
Figure 2 is an enlarged view of the subject air bleed unit.
Figure 3:
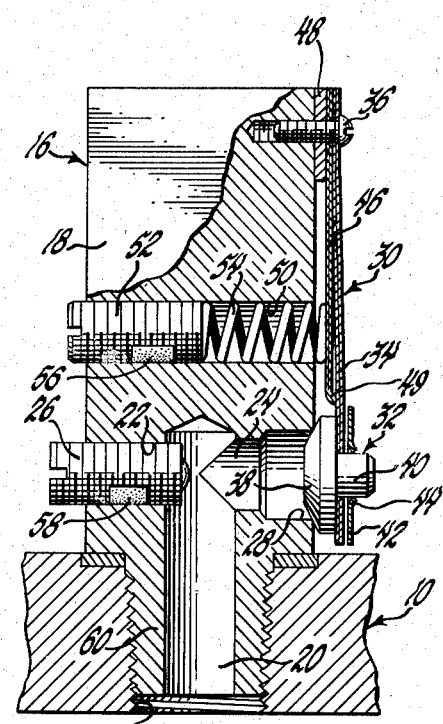
Figure 3 is a view along line 3—3 of Figure 2.

As seen in Figures 2 and 3, device 16 includes a casing 18 having a longitudinal passage 20 extending partially through the length of said casing. A diametral passage is formed through said casing and includes radial passage sections 22 and 24 which intersect with longitudinal passage 20. Radial passage 22 is threaded and blocked by a threaded plug 26 the purpose of which will subsequently be considered in greater detail. The other radial passage 24 includes a counterbored portion 28 providing a seat for a valve indicated generally at 30.

Valve 30 includes a valve element or plug 32 mounted at the end of a bimetal strip member 34 the other end of which is suitably secured to casing 18 through stud members 36. Valve element 32 includes an enlarged tapered portion 38 and a shank portion 40, the latter being adapted to extend through a centered opening in bimetal 34. The valve element 32 is retained upon the bimetal through a self-locking retaining ring 42 which includes a plurality of slightly upwardly inclined fingers 44 which bitingly engage the shank of the valve element when the ring is inserted thereover.

In order to provide a self-centering action permitting proper seating of the tapered portion 38 of valve element 32 within counterbore 28, the hole in bimetal 34 within which shank 40 is supported may be made slightly larger than the shank thus introducing a certain looseness whereby the valve member may seat properly notwithstanding slight misalignment.

In order to increase the travel or opening movement of the valve element 32, an auxiliary or secondary bimetal 46 is provided in combination with bimetal 34. Auxiliary bimetal 46 is disposed beneath bimetal 34 and secured to casing 18 through the same stud means 36. A spacer member 48 is disposed between auxiliary bimetal 46 and the casing 18 to reduce the inclination of bimetals to the casing thus insuring more effective seating of element 32.

To insure continuous contact by auxiliary bimetal 46 with bimetal 34 the former terminates at its free end in lip 49 extending toward and contacting the latter. Lip 49 introduces a bias between the bimetals and maintains a continuous contact therebetween at all times. Through the use of a pair of bimetals, as shown, a greater travel or opening movement of the valve element is realized for a given temperature change than if a larger single bimetal were used.

A second diametral passage 50 is formed in casing 18 intermediate radial passages 22—24 and the bimetal supporting studs 36. Passage 50 is internally threaded to receive an adjustable stud 52 as well as a spring member 54 adapted to seat at one end against stud 52 and at the other end against the auxiliary bimetal 46. It is an important feature of the present air bleed device to provide means for adjusting the temperature at which the valve element 32 will uncover passage 24 to bleed air therethrough. By threading stud 52 into passage 50 to increase the force of spring 54 and the consequent force with which it biases against the bimetals, valve 30 can be made to open at a relatively low temperature. On the other hand, threading stud 52 out of passage 50 reduces the biasing action of spring 54 which will in turn necessitate a greater temperature before valve 30 will be opened. The use of such a bleed device while universally desirable with a mass air flow type fuel system, to be commercially feasible must be adjustable to accommodate the varying operating characteristics between different engines.

Likewise the quantity of uncarbureted air bled into manifold 10 will be a variable depending again on the operating characteristics of the particular engine involved. To provide an adjustment for the quantity of bleed air, adjustable stud 26 may be threaded into or out of passage 22 thereby decreasing or increasing the quantity of bleed air which may flow through the passages 24 and 20. To lock the adjustable studs 26 and 52 in position, notches are provided therein to receive plastic or soft metal inserts 56 and 58 which prevent indiscriminate rotation of the respective studs.

End 60 of casing 18 adjacent the valve element 32 is reduced in cross section and externally threaded so that device 16 may be easily mounted on the appropriate part of the fuel induction system. As shown in the illustration of Figure 3, a threaded hole 62 is provided in intake manifold 10 into which device 16 is threaded.

Mounting bleed device 16 on intake manifold 10 is probably easiest where the device is added as an accessory after the vehicle has left the factory. On the other hand, if it is desired to install such a device as part of the manufacturer's original equipment, the bleed device may, if desired, be mounted directly on the carburetor so as to communicate with the carburetor induction passage posteriorly of the throttle valve. The mounting of bleed device 16 is thus a matter of preference with the sole requirement being that it be mounted in the induction system so that it is in communication with the manifold vacuum.

The operation of the bleed device is generally as follows. With the engine cold or operating below a predetermined temperature, bimetals 34 and 46 will maintain the valve element 32 in a seated position within counterbore 28 thereby blocking the flow of any uncarbureted air into intake manifold 10. As the engine ambient temperature increases and thereby decreases the density of the air being inducted into carburetor 12 tending to upset the desired fuel-air ratio, bimetals 34 and 46 will open the valve element 32 when the temperature exceeds a value predetermined through adjusting device 52—54 bleeding air through passages 24 and 20 into the intake manifold to maintain a substantially constant fuel-air ratio notwithstanding changes in ambient operating conditions.

It is apparent that by adjusting the quantity of air bleed through device 16 by the provision of an air flow adjusting stud 26 and, further, by providing means 52—54 for adjusting the bias on bimetals 34 and 46 a standard bleed device of universal applicability is provided which may be advantageously incorporated for use with any given engine.

I claim:

1. A temperature responsive valve device for bleeding air into the induction system of an internal combustion engine comprising a casing, a passage formed transversely through said casing, a longitudinal passage formed in said casing and communicating with said transverse passage, first means for adjusting flow through said longitudinal passage, valve means being adapted to coact with said transverse passage to control the flow of air therethrough, said valve means being mounted on bimetal means to control the actuation of said valve element in accordance with ambient temperatures, said bimetal means being mounted on said casing, resilient means mounted on said casing and adapted to engage said bimetal means, and means for adjusting the force exerted by said resilient means to vary the ambient temperature at which said bimetal means will open said valve means to permit air flow through said transverse and longitudinal passage means.

2. A temperature responsive valve device for bleeding air into the induction system of an internal combustion engine comprising a casing including an externally threaded end of reduced diameter, a pair of diametral passages formed through said casing and longitudinally spaced from one another, a longitudinal passage formed through the reduced portion of said casing and intersecting one of said diametral passages, a valve element being adapted to coact with said one diametral passage to control the flow of air therethrough, means operatively connected to said valve element to control the actuation of said valve element in accordance with ambient temperatures, resilient means disposed in the other diametral passage means and adapted to operatively engage said valve element means, and means for adjusting the force exerted by said resilient means to vary the ambient temperature at which said valve element will open to permit air flow through said longitudinal passage means.

3. A temperature responsive valve device for bleeding air into the induction system of an internal combustion engine comprising a casing including an externally threaded end of reduced diameter, a pair of diametral passages formed through said casing and longitudinally spaced from one another, a longitudinal passage formed through the reduced portion of said casing and intersecting one of said diametral passages, first valve means associated with said one end of the diametral passage to adjust the rate of air flow therethrough, a second valve element being adapted to coact with the other end of said one diametral passage to control the flow of air therethrough, said second valve element being mounted on bimetal means to control the actuation of said valve element in accordance with ambient temperatures, said bimetal means being mounted on said casing, resilient means disposed in the other diametral passage means and adapted to engage said bimetal means, and means for adjusting the rate of said resilient means to vary the ambient temperature at which said bimetal means will open said valve element to permit air flow through said longitudinal passage means.

4. A temperature responsive valve device as set forth in claim 3 in which said bimetal means is fixed at one end only to said casing, said second valve element mounted on the free end of the bimetal means proximate said other end of said one diametral passage.

5. A temperature responsive device as set forth in claim 4 in which the resilient means engages said bimetal means intermediate the fixed and free ends thereof.

6. A temperature responsive device as set forth in claim 4 in which the bimetal means comprises a first bimetal element having the second valve element mounted thereon and a second bimetal element terminating in proximately spaced relation to the valve element.

7. A temperature responsive device as set forth in claim 6 in which the second bimetal element is formed so as to continuously bias against said first bimetal element.

References Cited in the file of this patent

UNITED STATES PATENTS

| | | |
|---|---|---|
| 1,143,230 | Root | June 15, 1915 |
| 1,443,554 | Andrews | Jan. 30, 1923 |

FOREIGN PATENTS

| | | |
|---|---|---|
| 542,341 | Great Britain | Jan. 5, 1942 |